United States Patent [19]

Carey et al.

[11] Patent Number: 5,402,963
[45] Date of Patent: Apr. 4, 1995

[54] ACOUSTICALLY SHIELDED EXHAUST SYSTEM FOR HIGH THURST JET ENGINES

[75] Inventors: John P. Carey, Upper Marlboro, Md.; Robert Lee; Rudramuni K. Majjigi, both of Cincinnati, Ohio

[73] Assignee: General Electric Company, Cincinnati, Ohio

[21] Appl. No.: 138,569

[22] Filed: Oct. 18, 1993

Related U.S. Application Data

[63] Continuation of Ser. No. 945,072, Sep. 15, 1992, abandoned.

[51] Int. Cl.⁶ .............................................. B64D 33/04
[52] U.S. Cl. .......................... 244/1 N; 239/265.17; 239/265.39; 60/226.1; 60/242; 181/215; 181/220; 244/53 R
[58] Field of Search ........................... 244/1 N, 53 R; 239/265.17, 127.1, 127, 3, 265.39, 265.41; 181/220, 213, 215; 60/262, 226.1, 226.2, 226.3, 229, 242

[56] References Cited

U.S. PATENT DOCUMENTS

| | | | |
|---|---|---|---|
| 3,393,518 | 7/1968 | Bridge | 60/226.1 |
| 3,612,402 | 10/1971 | Timms | 239/265.41 |
| 3,618,701 | 11/1971 | Macdonald | 239/265.17 |
| 3,886,737 | 6/1975 | Grieb | 181/220 |
| 4,039,146 | 8/1977 | Wagenknecht | 239/265.41 |
| 4,043,121 | 8/1977 | Thomas et al. | 60/262 |
| 4,043,509 | 8/1977 | McHugh et al. | 60/262 |
| 4,280,587 | 7/1981 | Bhat | 60/262 |
| 4,291,782 | 9/1981 | Klees | 181/215 |
| 4,420,932 | 12/1983 | Mender et al. | 60/242 |
| 4,474,259 | 10/1984 | Wright | 60/262 |

FOREIGN PATENT DOCUMENTS

945862  1/1964  United Kingdom ................. 60/262

Primary Examiner—Galen L. Barefoot
Attorney, Agent, or Firm—Jerome C. Squillaro; Nathan D. Herkamp

[57] ABSTRACT

A flade exhaust nozzle for a high thrust jet engine is configured to form an acoustic shield around the core engine exhaust flowstream while supplementing engine thrust during all flight conditions, particularly during takeoff. The flade airflow is converted from an annular 360° flowstream to an arcuate flowstream extending around the lower half of the core engine exhaust flowstream so as to suppress exhaust noise directed at the surrounding community.

8 Claims, 6 Drawing Sheets

ACOUSTICALLY SHIELDED EXHAUST SYSTEM FOR HIGH THURST JET ENGINES

The invention herein described was made in the performance of work under a NASA contract and is subject to the provisions of Section 305 of the National Aeronautics and Space Act of 1958, Public Law 85-568 (72 Star. 435; 42 USC 2457).

This application is a continuation of application Ser. No. 07/945,072, filed Sep. 15, 1992, now abandoned.

BACKGROUND OF THE INVENTION

1. Field of the Invention

The present invention relates in general to noise suppression of jet engines and relates in particular to the use of a flade nozzle for providing a relatively low velocity exhaust flowstream which surrounds the lower portion of the core engine exhaust flowstream.

2. Description of Prior Developments

High thrust jet engines are currently used to power high speed civil transport aircraft, sometimes referred to as supersonic transport aircraft. Unfortunately, high thrust jet engines generate high exhaust noise levels which are subject to governmental noise level limits. In order to operate within such limits, jet noise abatement techniques including both mechanical suppression and acoustical shielding have been developed.

Mechanical noise suppression requires the installation of additional mechanical components to the jet engine, thereby undesirably adding additional weight to the engine. Acoustical shields require the production of a relatively low velocity exhaust stream which surrounds the primary or core engine exhaust stream. Such low velocity exhaust streams can be produced by bleeding gas from the core engine main jet through choke plates to reduce exhaust velocity. Unfortunately, this approach detracts from the main propulsion system and can impose both weight and drag penalties.

Accordingly, a need exists for a noise suppression system for a high speed, high thrust jet engine which does not impose significant weight and drag penalties on the engine.

SUMMARY OF THE INVENTION

The present invention has been developed to fulfill the needs noted above and therefore has as an object the provision of an acoustically shielded variable cycle jet engine which employs a flade or fan-on-blade exhaust stream as an acoustical shield.

Another object of the invention is to reduce the overall weight of an acoustically shielded and mechanically noise-suppressed, fladed, variable cycle engine by combining the functions of thrust production and noise suppression in a single flade exhaust system.

Another object of the invention is to reduce the thrust required from the core engine of a variable cycle engine during takeoff by providing about 20% to 30% of the required takeoff thrust from flade discharge airflow. By reducing the thrust of the core engine during takeoff, lower noise levels are achieved.

Still another object of the invention is to use a flade exhaust nozzle flowstream for supplementing takeoff thrust and for forming a low velocity acoustical shield around the lower surface of a high velocity exhaust flowstream issuing from a core engine exhaust nozzle.

Briefly, the invention is directed to a fladed variable cycle engine wherein an arcuate sectioned flade exhaust nozzle at least partially surrounds the lower portion of a core engine exhaust nozzle so that a relatively low velocity flade exhaust flowstream surrounds or ensheathes at least the lower portion of a high velocity core engine exhaust flowstream. The lower velocity flade exhaust stream reduces high frequency noise by reducing the mean shear between the high velocity core engine exhaust stream and the ambient air.

By producing an acoustic shield in the form of a flade exhaust flowstream, the variable cycle engine core flow may be optimized based on cruise thrust requirements without undue concern over takeoff thrust requirements. Moreover, the flade tip flow may be controlled to meet takeoff noise reduction requirements as well as cruise requirements.

That is, at takeoff, the flade exhaust velocity should be about one-half that of the core engine exhaust as the flade flow provides about 20% to 30% of takeoff thrust. At cruise, this thrust is reduced to about 10% of the required thrust for cruising. The flade exhaust flow can be varied by increasing the flade tip diameter to provide more or less noise suppression while a constant, optimum airflow is maintained through the core engine. In this manner, the core engine flow need not be changed to provide noise suppression.

Since the flade exhaust flowstream which produces the acoustic shield can provide about 20% to 30% of the required takeoff thrust, the core engine exhaust velocity and corresponding specific thrust may be reduced at takeoff. This provides even further reduction in exhaust noise levels of about 6 to 8 EPNdB as compared to the same core engine producing a higher specific thrust equal to 100% of the required takeoff thrust.

Without supplemental takeoff thrust from the flade flow, the core engine exhaust velocity would have to be increased. Such an increase in exhaust velocity would increase the difficulty of effectively suppressing the accompanying noise. With the supplemental thrust provided by the flade exhaust, the core engine need only operate at about 70% of its maximum thrust capability.

The flade exhaust duct advantageously transitions rearwardly from an annular 360° forward duct to an arcuate rear exhaust nozzle. The rear exhaust nozzle may extend over a circumferential arc of between about 150° and 240°, and preferably over an arc of about 200° to 220° centered around the lower half of the core engine exhaust nozzle.

By limiting the flade exhaust flow to an arcuate cross section, a thicker flade exhaust flowstream may be produced as compared to an annular flade exhaust flowstream. For example, by transitioning the flade exhaust flowstream from a 360° annulus to a 180° semi-circular flowpath, the thickness of the flade exhaust flowstream may be effectively doubled for a given flow.

Test data indicate that thicker acoustic shields provide additional noise reduction compared to thinner shields. Furthermore, by aligning the arcuate flade exhaust duct about the lower portion of the variable cycle engine, the remaining area above the arcuate exhaust duct may be used for purposes other than flade ducting, such as for the mounting of a thrust reverser mechanism. Shielding the underside of the core engine exhaust flowstream is also more efficient from a practical noise suppression view insofar as it is the noise from the lower portion of this exhaust which is radiated most directly toward the surrounding community.

The present invention allows utilization of the flade discharge airflow for propulsive thrust throughout the aircraft operational envelope while simultaneously providing noise suppression by ensheathing the lower 200° to 220° degrees of the core exhaust flowstream circumference. The utilization of the flade discharge airflow is efficiently achieved through the application of a unique flade exhaust nozzle.

The flade exhaust nozzle incorporates a lightweight arrangement of flaps, a translating outer shroud, independent flade exhaust nozzle throat and exit area controls, and a low profile compact design to achieve an efficient plug-type exhaust nozzle. An additional benefit of this invention is that this method of exhausting the flade discharge flowstream does not interfere with the deployment or efflux of the thrust reverser.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In The Drawings.

In the various figures of the drawing, like reference characters designate like parts.

DETAILED DESCRIPTION OF THE PREFERRED EMBODIMENT

Figure 1:
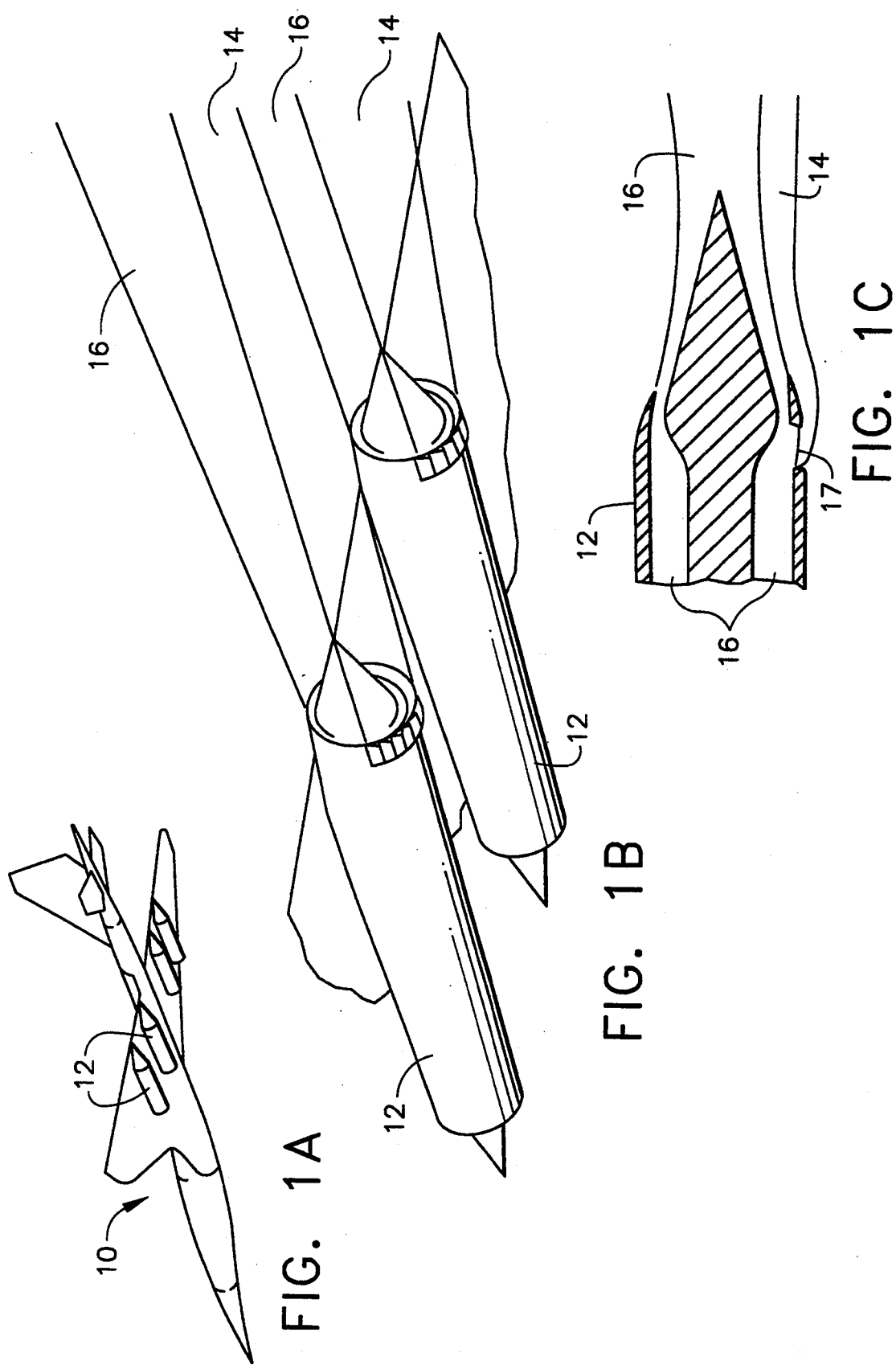
FIGS. 1A–1C are a schematic three-stage development of a jet engine provided with an acoustic shield according to the prior art.

The present invention will now be described in conjunction with the drawing, beginning with Fig. I which schematically illustrates a jet aircraft 10 powered by several jet engines 12. Each engine 12 is acoustically shielded from the underlying community by a relatively low velocity gas stream 14 which ensheathes the lower portion of a high velocity core engine exhaust flowstream 16 issuing from each engine 12.

The low velocity gas stream 14 is produced by ducting a portion of the high velocity core engine exhaust stream 16 through a series of choke plates 17. Although the general technique of acoustic shielding as depicted in FIG. 1 is known, the use of a flade exhaust flowstream for providing acoustic shielding as well as providing supplementing takeoff thrust as shown in FIG. 2 i.e. considered new.

Figure 2:
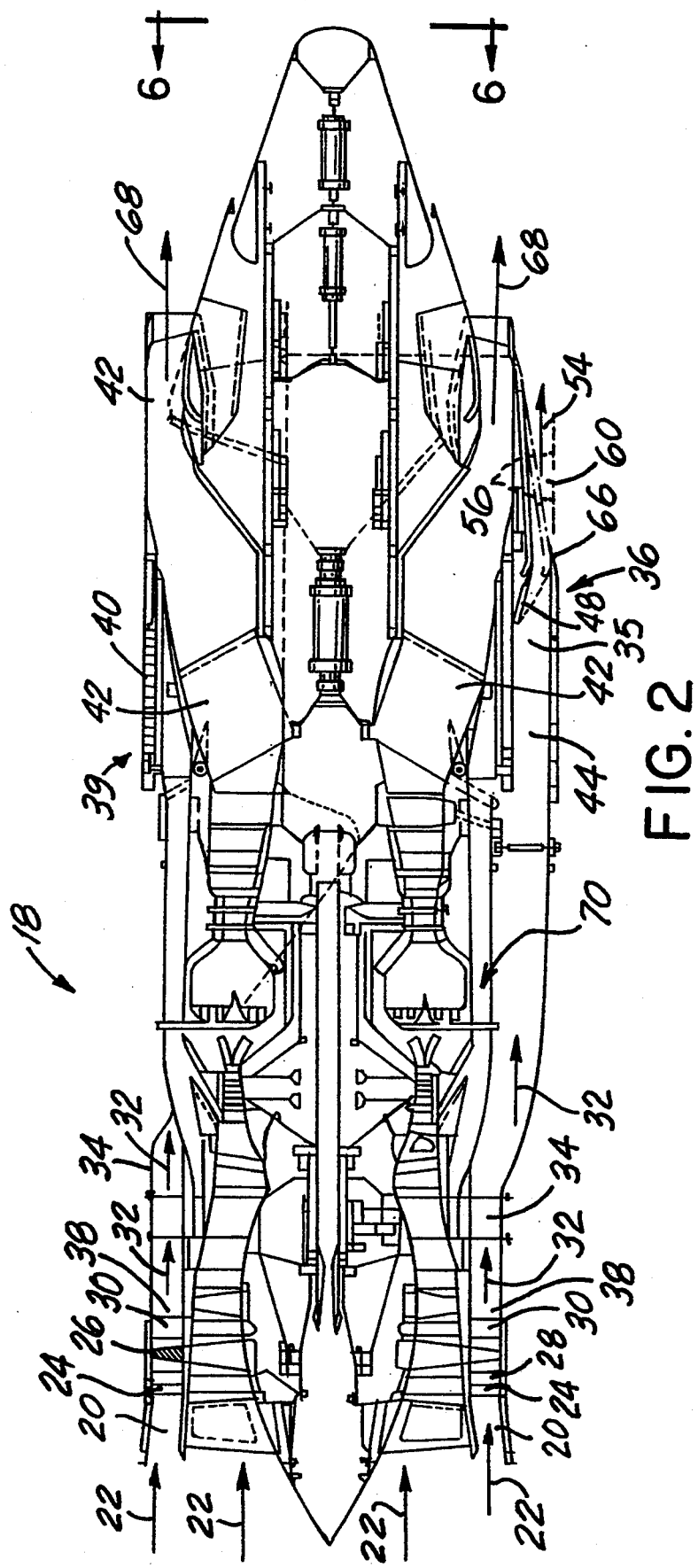
FIG. 2 is an axial sectional view of a fladed variable cycle jet engine fitted with an acoustically shielded exhaust system in accordance with the invention.

The "flade" or "fan-on-blade" variable cycle jet aircraft engine 18 illustrated in FIG. 2 includes a flade inlet 20 through which a large percentage of the engine inlet airflow 22 enters during aircraft takeoff. The airflow 22 which enters flade inlet 20 passes between an array of variable area inlet guide vanes 24. As seen in the takeoff position in FIG. 2, the inlet guide vanes 24 are actuated to their open position to direct large amounts of airflow onto the flade rotor 26.

During flight conditions other than takeoff, generally smaller percentages of engine inlet air-flow 22 enter the flade inlet 20 and pass between the inlet guide vanes 24 which may be actuated to either an open position, an intermediate position, or a closed position. However, even in the closed position some airflow 22 is required to pass through the inlet guide vanes 24 to cool the flade rotor 26 which is constantly rotating.

The inlet guide vanes 24 control the volume of airflow entering the flade flowpath 28 and direct the airflow at a proper angle onto the flade rotor 26 where the airflow is compressed and accelerated. The airflow discharged from the flade rotor 26 passes through the outlet guide vanes 30 which straighten the airflow and reduce its rotary velocity component.

Up to this point, the description of engine 18 is well known. The present invention begins where flade discharge airflow 32 enters and flows along a scroll duct 34 toward a convergent/divergent flade exhaust nozzle 36.

Figure 3:
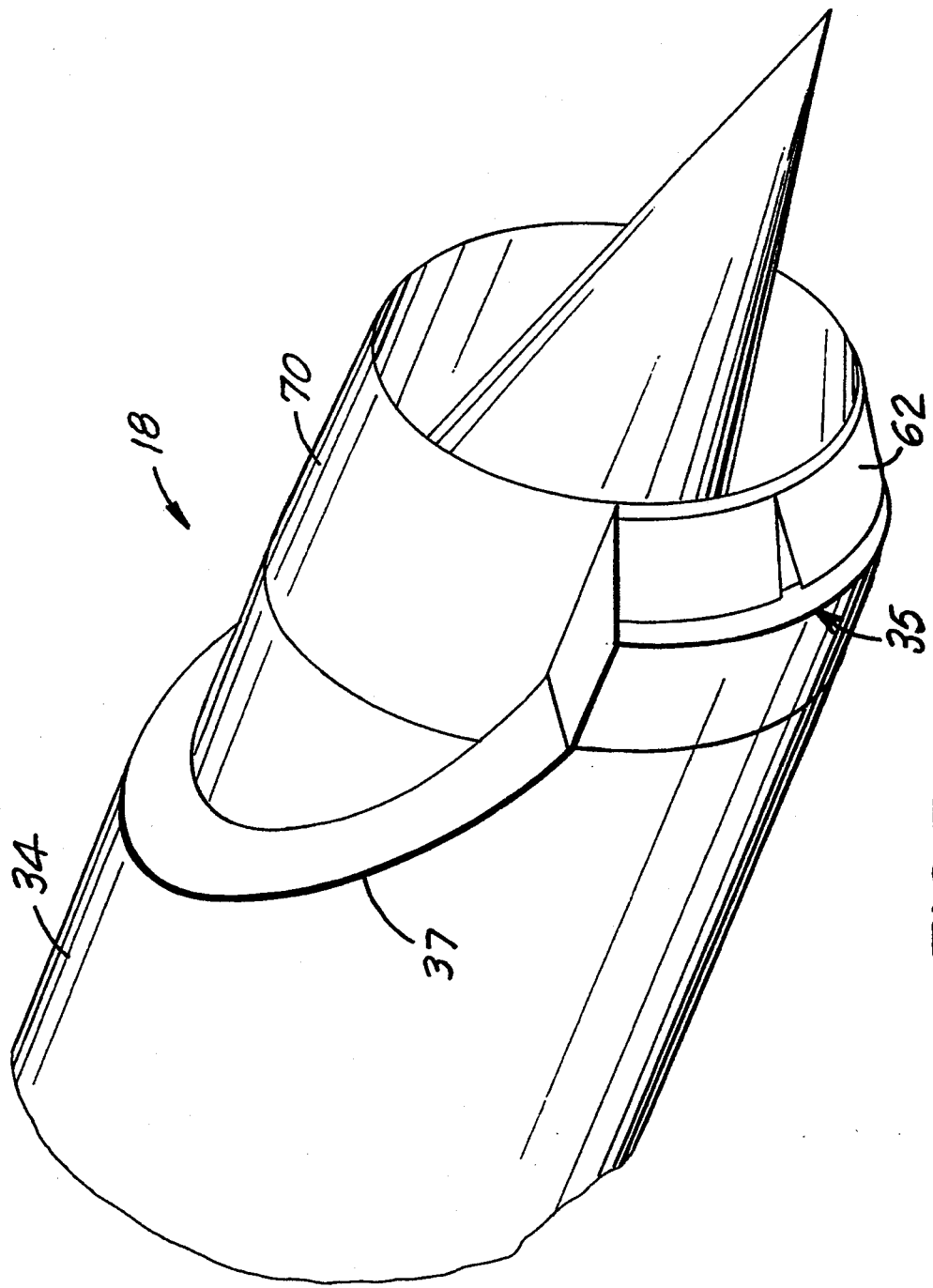
FIG. 3 is a schematic partial perspective view of a rear axial portion of FIG. 2 showing the transition of a flade duct from an annular flowpath to an arcuate flowpath.

At the annular interface 38 of the outlet guide vanes 30 and the scroll duct 34, the discharge airflow 32 moves axially through a circumscribed angle of 360°. As the scroll duct 34 extends axially rearward as depicted in FIG. 3, it progressively decreases the circumscribed flow angle along transition region 37 to an arcuate flowpath 35 extending over an arc of about 200° to 220° centered along the lower circumference of the engine 18.

The flade discharge airflow 32 is ducted in this manner to provide space for a thrust reversing mechanism 39 shown in FIG. 2 and to provide a relatively thick and effective acoustical shield as described below. Thrust reverser cascades 40 are located in the upper 140° around that portion of the circumference of the core flowpath 42 left free by the decreasing circumference of scroll duct 34.

Figure 4:
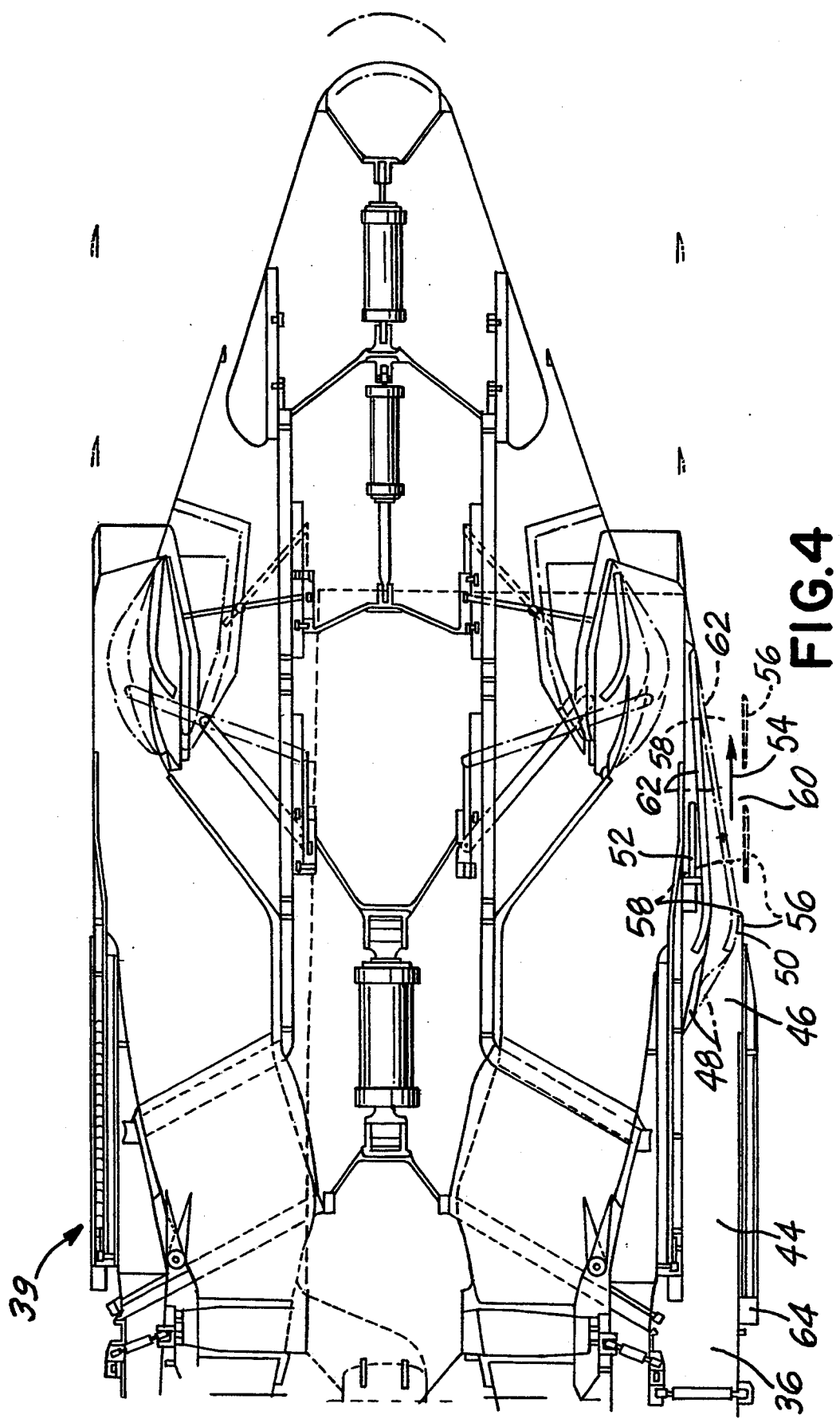
FIG. 4 is an enlarged view of the exhaust system of FIG. 2.
Figure 5:
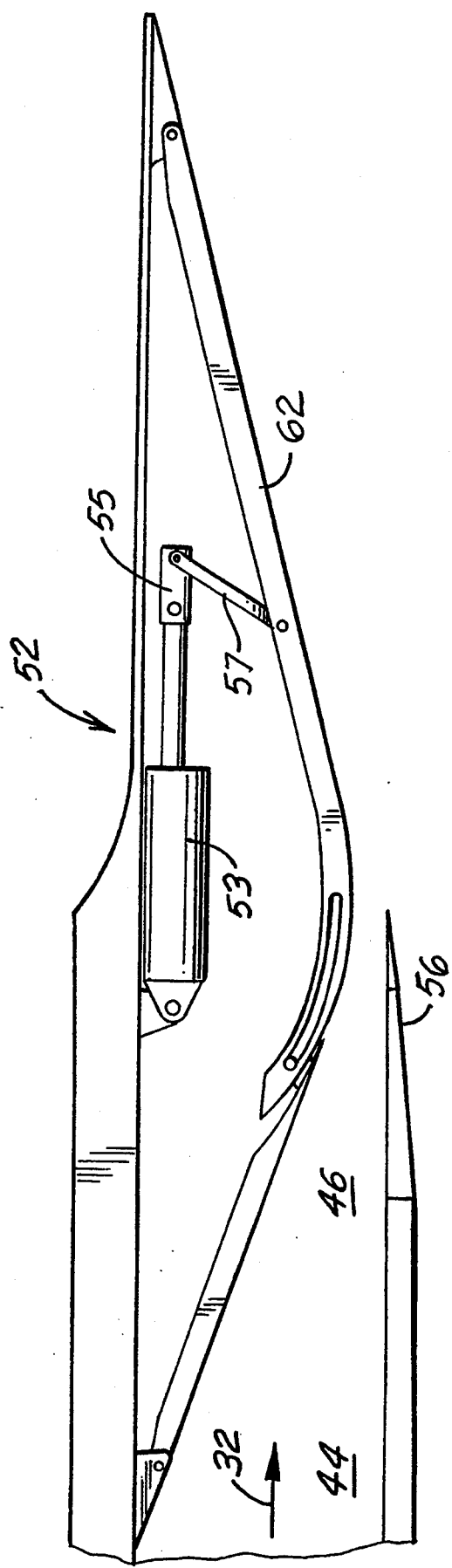
FIG. 5 is an enlarged partial view of FIG. 4 showing details of the flap actuation system.

As can be appreciated from the details of FIGS. 4 and 5, flade discharge airflow 32 accelerates as it enters the smaller area of the exhaust nozzle flowpath 44. This airflow further accelerates as it moves through the convergent section 46 of the flade exhaust nozzle 36 which is formed in part by primary flap 48.

The primary flap 48 is shown in solid lines in its most open position and in phantom in its most closed position. The flade discharge airflow 32 achieves sonic velocity at the end of the primary flap 48 at the throat 50 of the flade exhaust nozzle 36. The area of throat 50 is controlled and set by a conventional primary/secondary flap actuation system 52.

During takeoff, further acceleration and expansion of the flade nozzle exhaust flowstream 54 is unnecessary due to its low nozzle pressure ratio values. Accordingly, during takeoff, an axially translating flade outer shroud 56 is fully retracted as shown in solid lines in FIG. 4 so that the variable exhaust nozzle exit area 58 is approximately equal to the area of throat 50.

During flight conditions other than takeoff, further acceleration and expansion of the flade nozzle exhaust flowstream 54 is usually necessary due to increased flade nozzle pressure ratio values. To facilitate and control this acceleration and expansion of the flade nozzle exhaust flowstream 54, the translating outer shroud 56 is extended rearwardly as shown in phantom in FIG. 4 to form one side of a divergent flowpath 60 while secondary flaps 62 form the other side of the divergent flowpath.

As shown in FIG. 5, the secondary flaps 62 are actuated in unison by a generally conventional flap actuation system 52. Actuator 53 drives an arcuate actuation ring 55 which extends over an arc equal to about that of the exhaust flowstream 54, i.e. about 200° to 220°. A series of kinematic links 52 pivotally interconnect the actuation ring 55 to each of the secondary flaps 62.

The translating outer shroud 56 is positioned by an independent actuation system 64 to match the correct value of the exhaust exit area 58 for the desired expansion of the flade nozzle exhaust flowstream 54 to ambient pressure and corresponding acceleration of the flade nozzle exhaust flowstream 54 to the optimum exhaust velocity. The location of the end point 66 of the translating outer shroud 56 defines the flade exhaust nozzle exit area 58.

Figure 6:
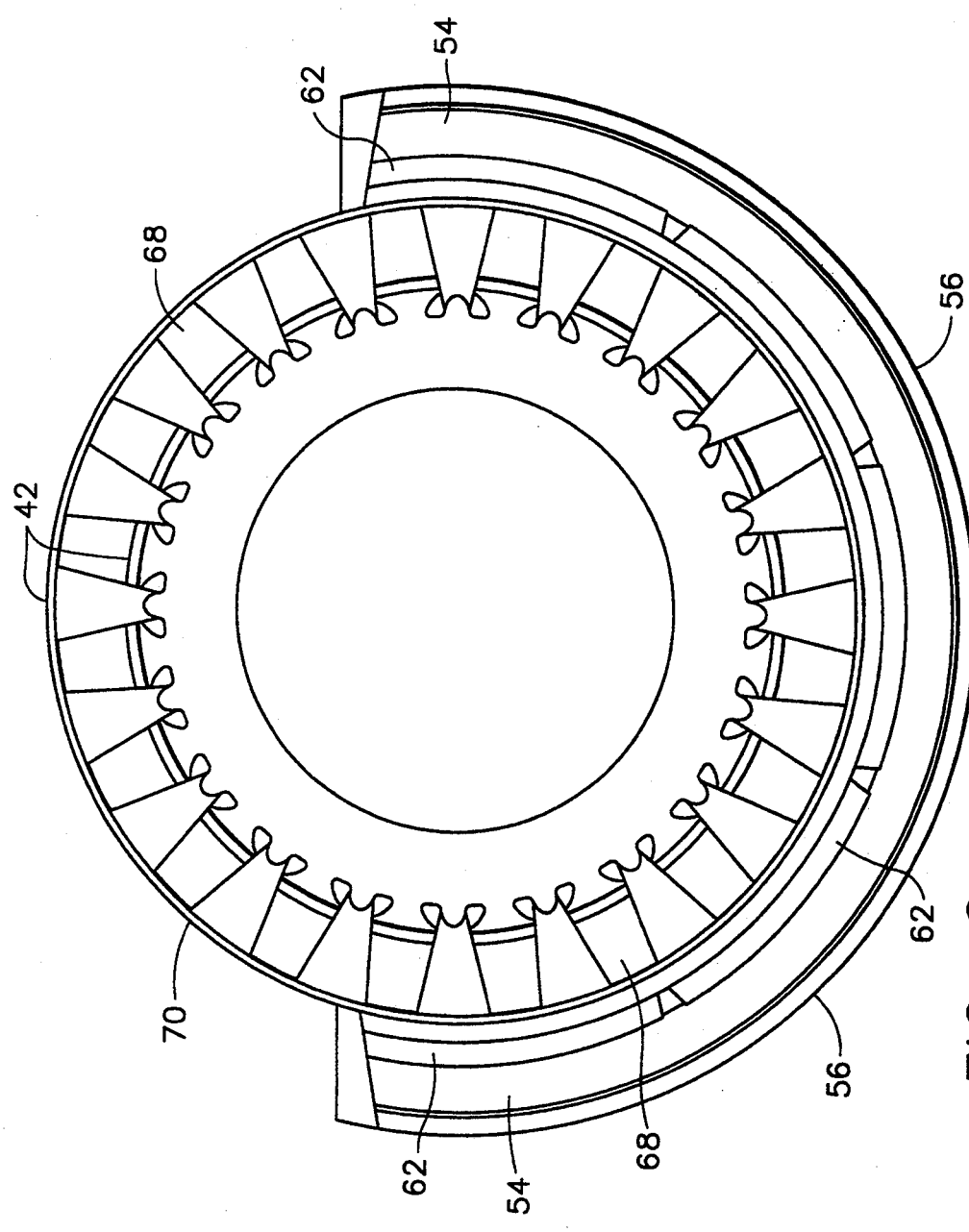
FIG. 6 is an aft view looking forward along line A—A of FIG. 2.

The independent control of the area of throat 50 and the flade exhaust nozzle exit area 58 enables the maintenance of a high degree of efficiency during all operating conditions. As shown in FIG. 6, the low temperature, low velocity flade nozzle exhaust flowstream 54 ensheathes the lower 200° to 220° of the high temperature, high velocity, annular core flowstream 68 issuing from core flowpath 42 and core engine 70 thereby forming an acoustic shield which reduces noise. This noise reduction is associated with the attenuative, reflective and refractive properties of the shield flowstream provided by flowstream 54 as it ensheathes the lower portion of the 360° core flowstream 68.

Although a preferred acoustic shield falls within the 200° to 220° arc as stated above, effective noise reduction may be achieved with a shield which circumferentially spans an arc of 150° to 240° around the lower portion of the high velocity core flowstream 68.

There has been disclosed heretofore the best embodiment of the invention presently contemplated. However, it is to be understood that various changes and modifications may be made thereto without departing from the spirit of the invention. For example, the acoustic shield could be easily adapted for use with a two-dimensional nozzle configuration.

What is claimed is:

1. A flade exhaust system for a high thrust jet engine having a flade rotor producing a flade discharge airflow and a core engine producing an exhaust, said flade discharge airflow having a relatively low temperature and a relatively low velocity as compared to a relatively high temperature and a relatively high velocity of said exhaust of said core engine; said system comprising:
   a flade nozzle for exhausting said low temperature, low velocity flade discharge airflow from said jet engine; and
   duct means extending between said flade rotor and said flade nozzle, said duct means defining an annular 360° flowpath adjacent said flade rotor and transitioning to an arcuate flowpath extending over an arc of 150° to 240° adjacent said flade nozzle such that said low temperature, low velocity flade discharge airflow forms an acoustic shield adjacent said high temperature, high velocity exhaust;
   wherein said duct means comprises a scroll duct having a circumference which progressively decreases in size from a forward end of said scroll duct to an aft end of said scroll duct such that said circumference extends over an arc of 150° to 240° at an aft end of said scroll duct adjacent said flade nozzle;
   wherein said arcuate flowpath is generally concentric with and disposed beneath said high temperature, high velocity exhaust.

2. The system of claim 1, wherein said flade nozzle comprises a convergent/divergent exhaust nozzle.

3. The system of claim 2, wherein said exhaust nozzle comprises a primary flap and a secondary flap.

4. The system of claim 3, wherein said exhaust nozzle further comprises an axially translatable outer shroud.

5. The system of claim 4, wherein said high thrust jet engine is a variable cycle jet engine, said system further comprising a means for independently controlling a throat area of said exhaust nozzle and an exit area of said exhaust nozzle, said means for independently controlling comprising first means for actuating said primary and secondary flaps and second means for independently actuating said shroud, wherein said means for independently controlling permits an efficient operation of said variable cycle jet engine during all operating conditions of said variable cycle jet engine.

6. A flade exhaust system for a high thrust jet engine having a flade rotor producing a flade discharge airflow and a core engine producing an exhaust, said flange discharge airflow having a relatively low temperature and a relatively low velocity as compared to a relatively high temperature and a relatively high velocity of said exhaust of said core engine; said system comprising:
   a flade nozzle for exhausting said low temperature, low velocity flade discharge airflow from said jet engine; and
   duct means extending between said flade rotor and said flade nozzle, said duct means defining an annular 360° flowpath adjacent said flade rotor and transitioning to an arcuate flowpath extending over an arc of 150° to 240° adjacent said flade nozzle such that said low temperature, low velocity flade discharge airflow forms an acoustic shield adjacent said high temperature, high velocity exhaust;
   wherein said duct means comprises a scroll duct having a circumference which progressively decreases in size from a forward end of said scroll duct to an aft end of said scroll duct such that said circumference extends over an arc of 150° to 240° at an aft end of said scroll duct adjacent said flade nozzle;
   wherein said arcuate flowpath extends over an arc of about 200° to 220° which is centered along a lower circumference of said jet engine, said arcuate flowpath being generally concentric with said high velocity exhaust.

7. A method for suppressing exhaust noise produced by a high thrust jet engine having a flade rotor producing a flade airflow and a core engine producing an exhaust, said flade discharge airflow having a relatively low temperature and a relatively low velocity as compared to a relatively high temperature and a relatively high velocity of said exhaust of said core engine, wherein said method comprises the steps of:
   forming a scroll duct having a circumference which progressively decreases over an axial length of said scroll duct for transitioning said low temperature, low velocity flade airflow from an annular flowpath to an arcuate flowpath; and
   ensheathing a portion of said high temperature high velocity exhaust with said arcuate flowpath of said low temperature, low velocity flade airflow so as to form an acoustic shield around said portion of said high temperature, high velocity exhaust with said low temperature, low velocity flade airflow;

wherein said step of forming comprises the step of ducting said low temperature, low velocity flade airflow from an annular flowpath to an arcuate flowpath extending over an arc of about 200° to 220° centered below and adjacent to said high temperature, high velocity exhaust.

8. A method for acoustically shielding a flade, variable cycle jet engine, said method comprising the steps of:
providing a single flade exhaust system for said fladed, variable cycle jet engine;
achieving noise suppression of said fladed, variable cycle jet engine with said single flade exhaust system;
supplementing takeoff thrust of said fladed, variable cycle jet engine with said single flade exhaust system;
wherein said step of providing comprising the steps of:
forming duct means extending between a flade rotor and a flare nozzle of said fladed, variable cycle jet engine for ducting a relatively low temperature, relatively low velocity flade airflow emanating from said flade rotor, and
progressively decreasing a circumference of said duct means so as to transition said low temperature, low velocity flade airflow from an annular flowpath to an arcuate flowpath extending over an arc of about 200° to 220°;
wherein said step of achieving comprises the steps of:
ensheathing a portion of a relatively high temperature, relatively high velocity exhaust produced by a core engine of said fladed, variable cycle jet engine with said arcuate flowpath of said low temperature, low velocity flade airflow,
positioning said arcuate flowpath of said low temperature, low velocity flade airflow below and adjacent to said high temperature, high velocity exhaust;
wherein said step of supplementing comprises the step of providing about 20% to 30% of takeoff thrust with said low temperature, low velocity flade airflow.

* * * * *